(12) United States Patent
Nakano et al.

(10) Patent No.: US 10,514,058 B2
(45) Date of Patent: Dec. 24, 2019

(54) BEARING DEVICE AND ROTARY MACHINE (71) Applicant: Mitsubishi Hitachi Power Systems, Ltd., Yokohama-shi, Kanagawa (JP)

(72) Inventors: Takashi Nakano, Yokohama (JP); Tanehiro Shinohara, Tokyo (JP); Takaaki Kaikogi, Tokyo (JP); Yuichiro Waki, Yokohama (JP); Yutaka Ozawa, Takasago (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 16/086,473

(22) PCT Filed: Aug. 10, 2016

(86) PCT No.: PCT/JP2016/073666
§ 371 (c)(1),
(2) Date: Sep. 19, 2018

(87) PCT Pub. No.: WO2018/029835
PCT Pub. Date: Feb. 15, 2018

(65) Prior Publication Data
US 2019/0072128 A1 Mar. 7, 2019

(51) Int. Cl.
*F16C 33/10* (2006.01)
*F16C 17/02* (2006.01)
*F16C 17/03* (2006.01)

(52) U.S. Cl.
CPC ............ *F16C 17/03* (2013.01); *F16C 33/10* (2013.01)

(58) Field of Classification Search
CPC .......... F16C 17/02; F16C 17/03; F16C 17/33; F16C 17/10; F16C 17/1025; F16C 17/1055; F05D 2260/98
See application file for complete search history.

(56) References Cited

U.S. PATENT DOCUMENTS 4,815,865 A * 3/1989 Gerling .................. F16C 17/03
384/117
8,123,409 B2 2/2012 Waki et al.
(Continued)

FOREIGN PATENT DOCUMENTS

| JP | 2001-132737 A | 5/2001 |
| JP | 2006112612 A * | 4/2006 |

(Continued)

OTHER PUBLICATIONS

International Search Report dated Nov. 1, 2016, issued in counterpart application No. PCT/JP2016/073666 (2 pages).
(Continued)

*Primary Examiner* — Phillip A Johnson
(74) *Attorney, Agent, or Firm* — Westerman, Hattori, Daniels & Adrian, LLP (57) ABSTRACT

A bearing device includes: a carrier ring; a first bearing portion disposed along an outer periphery of a rotor shaft on a radially inner side of the carrier ring; a second bearing portion disposed along the outer periphery of the rotor shaft and downstream of the first bearing portion, with respect to a rotational direction of the rotor shaft, on the radially inner side of the carrier ring; and a pair of side plates disposed along the outer periphery of the rotor shaft, on both sides of the carrier ring with respect to an axial direction. In a carrier-ring side region of an inner peripheral surface of each of the side plates, a groove extending in a circumferential direction along a side surface of the first bearing portion is formed at least in a part of an extending range of the first bearing portion.

10 Claims, 6 Drawing Sheets

(56) References Cited

U.S. PATENT DOCUMENTS

| | | |
|---|---|---|
| 9,217,464 B2* | 12/2015 | Rudolph ................. F16C 17/03 |
| 2010/0220944 A1 | 9/2010 | Waki et al. |
| 2016/0053687 A1 | 2/2016 | Tsutsumi et al. |
| 2017/0260870 A1* | 9/2017 | Sebrecht ............... F04D 29/563 |

FOREIGN PATENT DOCUMENTS

| | | |
|---|---|---|
| JP | 2009-63015 A | 3/2009 |
| JP | 2010-203481 A | 9/2010 |
| JP | 2014-196788 A | 10/2014 |
| JP | 2014-202268 A | 10/2014 |
| JP | 2016-11698 A | 1/2016 |
| WO | 2010/097990 A1 | 9/2010 |

OTHER PUBLICATIONS

Notification of Reasons for Refusal dated Aug. 17, 2018, issued in counterpart Japanese Patent Application No. 2015-021767, w/English translation (7 pages).

Office Action dated Jun. 28, 2019, issued in counterpart CN application No. 201680084063.7, with English translation. (15 pages).

* cited by examiner

BEARING DEVICE AND ROTARY MACHINE

TECHNICAL FIELD

The present disclosure relates to a bearing device for rotatably supporting a rotational shaft, and a rotary machine.

BACKGROUND ART

Generally, a rotary machine such as a steam turbine and a gas turbine includes a bearing device for rotatably supporting a rotor shaft (rotational shaft). Normally, lubricant oil is interposed between an outer peripheral surface of the rotor shaft and a bearing surface of a bearing portion supporting the rotor shaft, to ensure a lubricating property therebetween.

For instance, Patent Document 1 discloses a tilting-pad bearing configured to support a rotor shaft with a plurality of bearing pads arranged in the circumferential direction of the rotational shaft. In this tilting-pad bearing, lubricant oil is supplied from a plurality of oil-supply nozzles disposed upstream and downstream of the bearing pads, to the gap between the outer peripheral surface of the rotor shaft and the bearing surfaces of the bearing pads. Furthermore, side plates are disposed on both end surfaces of the lower half part of the carrier ring, so as to suppress leakage of lubricant oil supplied from the oil-supply nozzles to the outside.

CITATION LIST

Patent Literature

Patent Document 1: WO2010/097990A
Patent Document 2: JP2016-011698A
Patent Document 3: JP2009-063015A

SUMMARY

Problems to be Solved

However, in the tilting-pad bearing disclosed in Patent Document 1, the oil from the upstream side toward the downstream side between the bearing surfaces of the bearing pads and the outer peripheral surface of the rotor shaft in accordance with rotation of the rotor shaft is heated by friction with the bearing surfaces of the bearing pads or the outer peripheral surface of the rotor shaft. Thus, oil having an increased temperature flows through downstream bearing pads, where more friction heat is accumulated, and thus the temperature increases considerably. An excessive temperature increase of a bearing pad may be one of the causes of malfunction of the bearing device. Thus, it is necessary to develop a technique to suppress temperature increase of bearing pads.

In this regard, Patent Document 1 does not disclose any specific measure for suppressing temperature increase of the bearing pads.

In view of the above, an object of at least one embodiment of the present invention is to provide a bearing device whereby it is possible to suppress temperature increase of a bearing portion effectively, and a rotary machine.

Solution to the Problems (1) A bearing device according to at least one embodiment of the present invention includes: a carrier ring; a first bearing portion disposed along an outer periphery of a rotor shaft on a radially inner side of the carrier ring; a second bearing portion disposed along the outer periphery of the rotor shaft and downstream of the first bearing portion, with respect to a rotational direction of the rotor shaft, on the radially inner side of the carrier ring; a pair of side plates disposed along the outer periphery of the rotor shaft, on both sides of the carrier ring with respect to an axial direction. In a carrier-ring side region of an inner peripheral surface of each of the side plates, a groove extending in a circumferential direction along a side surface of the first bearing portion is formed at least in a part of an extending range of the first bearing portion. The bearing device further includes an oil guide portion configured to guide oil after flowing into the groove from a gap between an inner peripheral surface of the first bearing portion and an outer peripheral surface of the rotor shaft and return the oil to a gap between a downstream end portion of the first bearing portion and an upstream end portion of the second bearing portion.

With the above bearing device (1), oil having a relatively low-temperature flowing through the groove that extends in the circumferential direction along the side surface of the first bearing portion is returned by the oil guide portion to the gap between the downstream end portion of the first bearing portion and the upstream end portion of the second bearing portion. Thus, it is possible to supply the relatively low-temperature oil to the gap between the inner peripheral surface of the second bearing portion and the outer peripheral surface of the rotor shaft, and to effectively suppress temperature increase of the second bearing portion.

(2) In an embodiment, in the above configuration (1), the oil guide portion includes a flow guide wall disposed on each of the side plates so as to protrude toward the carrier ring inside the groove, and the flow guide wall is inclined from a direction orthogonal to an axial direction of the rotor shaft, so as to become closer to the carrier ring toward a downstream side with respect to the rotational direction of the rotor shaft.

With the above configuration (2), the oil guide portion includes the flow guide wall disposed on each of the side plates so as to protrude toward the carrier ring in the groove, and thus it is possible to change the flow direction of oil flowing through the groove toward the center side with respect to the width direction of the second bearing portion, with the flow guide wall. Furthermore, the flow guide wall is inclined from a direction orthogonal to the axial direction of the rotor shaft so as to become closer to the carrier ring toward the downstream side with respect to the rotational direction of the rotor shaft, and thus it is possible to change the flow direction smoothly without impairing the flow of oil (side flow) inside the groove.

(3) In some embodiments, in the above configuration (1) or (2), the oil guide portion includes an inner flow passage disposed inside the side plates so as to bring into communication an oil inlet aperture and an oil outlet aperture each of which has an opening into the groove. The oil inlet aperture is positioned by the side of the first bearing portion. The oil outlet aperture is disposed on a circumferential-directional position between the downstream end portion of the first bearing portion and the upstream end portion of the second bearing portion.

With the above configuration (3), the flow of oil (side flow) in the groove passes through the inner flow passage from the oil inlet aperture by the side of the first bearing portion, and returns into the groove from the oil outlet aperture disposed between the downstream end portion of the first bearing portion and the upstream end portion of the second bearing portion. Thus, it is possible to limit the flow passage of the side flow between the first bearing portion and the second bearing portion to the inner flow passage, and guide the side flow reliably from the first bearing portion toward the second bearing portion.

(4) In some embodiments, in any one of the above configurations (1) to (3), the groove extends along the outer periphery of the rotor shaft, in a circumferential-directional range including an extending range of the first bearing portion and the second bearing portion.

With the above configuration (4), it is possible to guide oil with a relatively low-temperature that leaks sideways from the first bearing portion downstream toward the upstream end portion of the second bearing portion, via the groove disposed on the side plate in the circumferential-directional range including the first bearing portion and the second bearing portion.

(5) In some embodiments, in any one of the above configurations (1) to (4), provided that W is an entire width of each of the side plates in the axial direction and $W_g$ is an axial directional width of the groove, an expression $0.15W \leq W_g$ is satisfied.

In this way, it is possible to ensure a sufficient flow-passage cross sectional area for the groove, and to effectively guide oil with a relatively low-temperature that leaks sideways from the gap between the inner peripheral surface of the first bearing portion and the outer peripheral surface of the rotor shaft downstream toward the oil guide portion.

(6) In some embodiments, in any one of the above configurations (1) to (5), the bearing device further includes a fin which is disposed on an inner peripheral surface of each of the side plates and which extends along the outer periphery of the rotor shaft on both sides across the downstream end portion of the first bearing portion with respect to the rotational direction of the rotor shaft. The groove is formed by a recess portion defined by the fin and the inner peripheral surface of each side plate which is closer to the carrier ring than the fin.

With the above configuration (6), by providing the fin on the inner peripheral surface of the side plate along the outer periphery of the rotor shaft, it is possible to form the groove (recess portion) with a simple configuration. Furthermore, since a portion other than the fin, of the outer peripheral surface of the side plate, functions as the groove, it is possible to ensure a sufficient flow-passage cross sectional area for the groove to guide relatively low-temperature oil leaking sideways from the gap between the inner peripheral surface of the first bearing portion and the outer peripheral surface of the rotor shaft.

(7) In some embodiments, in any one of the above configurations (1) to (6), a gap between the inner peripheral surface of each of the side plates and the outer peripheral surface of the rotor shaft is narrower in a circumferential directional region of at least a part of an extending range of the first bearing portion than in at least a part of a circumferential directional range upstream of an upstream end portion of the first bearing portion and downstream of a downstream end portion of the second bearing portion.

As in the above (7), with the gap between the inner peripheral surface of the side plate and the outer peripheral surface of the rotor shaft in the circumferential-directional region of at least a part of an extending range of the first bearing portion being relatively small, it is possible to suppress discharge of relatively low-temperature oil in the groove to outside via the gap. Accordingly, it is possible to ensure a sufficient flow rate of relatively low-temperature oil (oil flowing through the groove) introduced to the second bearing portion by the oil guide portion.

(8) In some embodiments, in any one of the above configurations (1) to (7), a bottom surface of the groove is positioned on an inner side of an outer peripheral surface of the first bearing portion, with respect to a radial direction of the carrier ring.

With the above configuration (8), the groove is disposed on the inner side of the outer peripheral surface of the first bearing portion with respect to the radial direction of the carrier ring, and thus it is possible to receive relatively low-temperature oil leaking sideways from the first bearing portion to the space surrounded by the bottom surface of the groove of the side plate and the side surface of the first bearing portion.

(9) In some embodiments, in any one of the above configurations (1) to (8), the bearing device further includes a semi-circular bearing portion disposed on a radially inner side of an upper half region of the carrier ring and configured to restrain backlash of the rotor shaft from above. The first bearing portion and the second bearing portion are a pair of respective bearing pads disposed on a radially inner side of a lower half region of the carrier ring and configured to support the rotor shaft from below.

With the above configuration (9), the semi-circular bearing portion is disposed on the radially inner side of the upper half region of the carrier ring, and thereby it is possible to restrict backlash of the rotor shaft with the semi-circular bearing portion, and to prevent breakage or the like of components of the rotary machine due to backlash of the rotor shaft. Furthermore, the first bearing portion and the second bearing portion (a pair of bearing pads) are disposed in the lower half region of the carrier ring, and thus it is possible to support the rotor shaft appropriately with the pair of bearing pads.

(10) A rotary machine according to at least one embodiment of the present invention includes: the bearing device according to any one of the above (1) to (9); and a rotational shaft supported by the bearing device.

With the above rotary machine (10), it is possible to suppress temperature increase of the second bearing portion of the bearing device, and thus it is possible to operate the rotary machine smoothly.

Advantageous Effects

According to at least one embodiment of the present invention, the relatively low-temperature oil flowing through the groove extending in the circumferential direction along the side surface of the first bearing portion is returned to the gap between the downstream end portion of the first bearing portion and the upstream end portion of the second bearing portion, and thus it is possible to supply the relatively low-temperature oil to the gap between the inner peripheral surface of the second bearing portion and the outer peripheral surface of the rotor shaft, and to effectively suppress temperature increase of the second bearing portion.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

In the present specification, the expression "upper half" in terms like "upper half section" and "upper half region" refers to an upper portion in the vertical direction (gravity direction). Similarly, in the present specification, the expression "lower half" in terms like "lower half section" and "lower half region" refers to a lower portion in the vertical direction (gravity direction).

First, with reference to FIGS. 1 and 2, the overall common configuration of a bearing device 10 according to some embodiments will be described.

Figure 1:
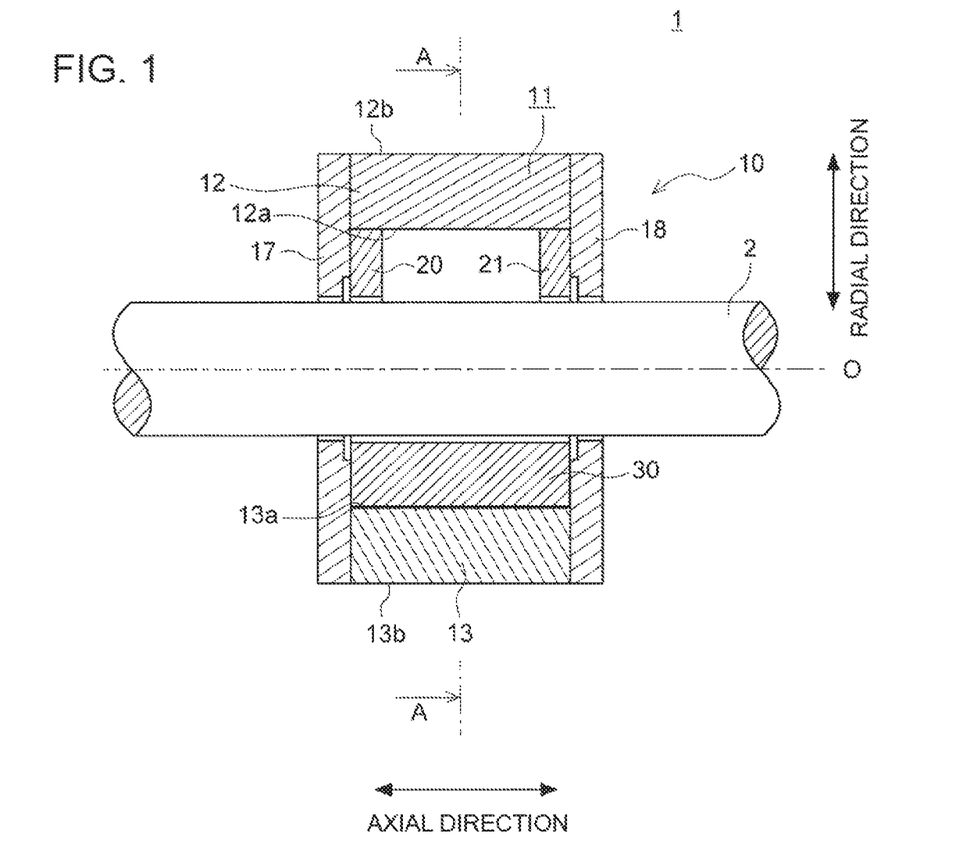
FIG. 1 is a cross-sectional view of a bearing device according to an embodiment, taken along its axial direction.

FIG. 1 is a cross-sectional view of a bearing device 10 according to an embodiment, taken along its axial direction. FIG. 2 is a cross-sectional view taken along line A-A in FIG. 1. FIG. 2 is a cross section taken in a direction orthogonal to the axial direction. In the present embodiment, "axial direction" refers to the direction of the center axis O of the rotor shaft 2 supported by the bearing device 10, and "radial direction" refers to the direction of the radius of the rotor shaft 2, and "circumferential direction" refers to the circumferential direction of the rotor shaft 2.

Figure 2:
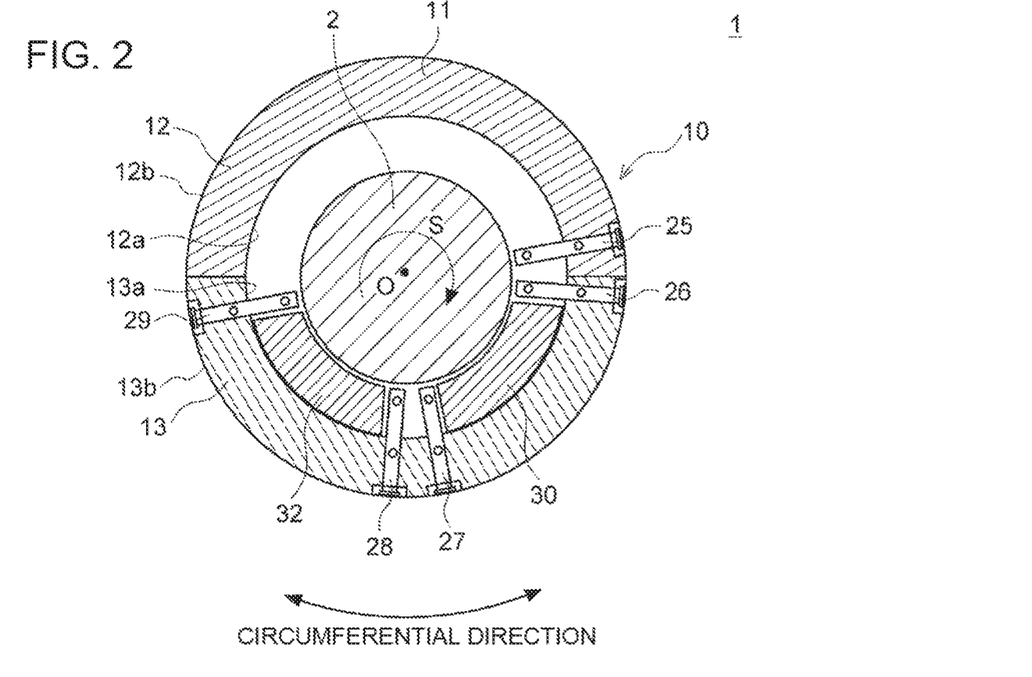
FIG. 2 is a cross-sectional view taken along line A-A in FIG. 1.

The bearing device 10 shown in FIGS. 1 and 2 is a tilting-pad bearing (journal bearing) that uses the direct lubrication method as a lubrication method (oil supply method), and includes a first bearing portion (first bearing pad 30) and a second bearing portion (second bearing pad 32) disposed in the lower half region. Hereinafter, the bearing device 10 shown in the drawings will be described as an example. Nevertheless, the bearing device 10 according to the present embodiment is not limited to this configuration. For instance, in another embodiment, the bearing device 10 may be a thrust bearing, or may use another lubricant method such as oil bath lubrication. Furthermore, in another embodiment, another two bearing pads may be disposed in the upper half region, such that four bearing pads are mounted in the circumferential direction in total. Alternatively, three or more bearing pads may be disposed in the lower half region.

The bearing device 10 according to the present embodiment may be applied to a rotary machine 1, that is, for instance, a turbine such as a gas turbine, a steam turbine (a steam turbine of a nuclear power plant), and a machine-driving turbine, a wind power machine such as a wind turbine generator, or a supercharger.

The rotary machine 1 includes a rotor shaft 2 to be rotary driven, a bearing housing (not shown) accommodating the rotor shaft 2, and the bearing device 10 for supporting the rotor shaft 2.

In an embodiment, the bearing device 10 includes a carrier ring 11 mounted to the bearing housing (not shown) of the rotary machine 1, a pair of side plates 17, 18 disposed on both sides of the carrier ring 11 with respect to the axial direction, and a first bearing pad 30 and a second bearing pad 32 disposed radially inside the carrier ring 11.

Furthermore, the bearing device 10 further includes an oil guide portion 40, 50 (see FIGS. 3 and 7) as features for suppressing temperature increase of the second bearing pad 32. The configuration including the oil guide portion 40, 50 will be described later.

Hereinafter, the specific configuration example of each component in the bearing device 10 will be described specifically.

The carrier ring 11 includes an upper half section carrier ring 12 and a lower half section carrier ring 13. The upper half section carrier ring 12 and the lower half section carrier ring 13 include inner peripheral surfaces 12a, 13a and outer peripheral surfaces 12b, 13b, respectively, each of which has a semi-circular cross section in a direction perpendicular to the axial direction. In the example shown in the drawings, the carrier ring 11 is divided into the upper half section carrier ring 12 and the lower half section carrier ring 13. Nevertheless, the carrier ring 11 may have an integrated structure.

On both end sides of the carrier ring 11 with respect to the axial direction, a pair of side plates 17, 18 are disposed along the outer periphery of the rotor shaft 2. The side plates 17, 18 are formed to have a disc shape, and have a hole formed in the center, through which the rotor shaft 2 is inserted. These side plates 17, 18 suppress outward leakage of lubricant oil supplied from the oil-supply nozzles 25 to 29 described below, to a suitable extent.

The upper half section carrier ring 12 includes guide metals (semi-circular bearing portions) 20, 21 mounted to the inner peripheral surface 12a, mainly to suppress backlash of the rotor shaft 2 from above. For instance, a pair of guide metals 20, 21 are mounted on both end sides, with respect to the axial direction, of the upper half section carrier ring 12, and on the inner side, with respect to the axial direction, of the side plates 17, 18. The guide metals 20, 21 are formed to have a semi-circular shape.

As described above, the guide metals 20, 21 are disposed on the radially inner side of the upper half section carrier ring 12, and thereby it is possible to restrict backlash of the rotor shaft 2 with the guide metals 20, 21, and to prevent breakage or the like of a component due to backlash of the rotor shaft 2. In a case where the carrier ring 11 has an integrated structure instead of a structure divided into the upper half section carrier ring 12 and the lower half section carrier ring 13, or has a structure divided into three pieces or more, it is sufficient if the guide metals 20, 21 are disposed in the upper half region of the carrier ring 11.

The upper half section carrier ring 12 and the lower half section carrier ring 13 include at least one oil-supply nozzles 25 to 29.

In the example shown in FIG. 2, in a case where the rotor shaft 2 rotates clockwise as indicated by the arrow S in the drawing, five oil-supply nozzles are disposed from the upstream side with respect to the rotational direction S of the rotor shaft 2, including: the first oil-supply nozzle 25, the second oil-supply nozzle 26, the third oil-supply nozzle 27, the fourth oil-supply nozzle 28, and the fifth oil-supply nozzle 29. The first oil-supply nozzle 25 and the second oil-supply nozzle 26 are disposed aligned in the circumferential direction, on the upstream side of the first bearing pad 30 positioned on the upstream side. A gap may be disposed between the second oil-supply nozzle 26 and the upstream end portion of the bearing pad 30. The third oil-supply nozzle 27 and the fourth oil-supply nozzle 28 are disposed aligned in the circumferential direction, between the first bearing pad 30 and the second bearing pad 32 disposed on the downstream side of the first bearing pad 30. A gap may be disposed between the third oil-supply nozzle 27 and the downstream end portion of the first bearing pad 30. A gap may be disposed between the fourth oil-supply nozzle 28 and the upstream end portion of the second bearing pad 32. The fifth oil-supply nozzle 29 is disposed downstream of the second bearing pad 32. A gap may be disposed between the fifth oil-supply nozzle 29 and the second bearing pad 32.

A lubricant oil supply passage (not shown) is disposed through the carrier ring 11. Lubricant oil supplied to the lubricant oil supply passage is sent to each of the oil-supply nozzles 25 to 29, and is injected from each of the oil-supply nozzles 25 to 29 to the vicinity of the bearing pads 30, 32.

The first bearing pad 30 and the second bearing pad 32 are disposed on the radially inner side of the lower half section carrier ring 13, and are configured to support the rotor shaft 2 from below.

The first bearing pad 30 is disposed along the outer periphery of the rotor shaft 2, on the radially inner side of the lower half section carrier ring 13.

The second bearing pad 32 is disposed along the outer periphery of the rotor shaft 2, on the radially inner side of the lower half section carrier ring 13, downstream of the first bearing pad 30 with respect to the rotational direction S of the rotor shaft 2.

Accordingly, the first bearing pad 30 and the second bearing pad 32 are disposed on the lower half section carrier ring 13, and thus it is possible to support the rotor shaft 2 appropriately with the first bearing pad 30 and the second bearing pad 32.

In a case where the carrier ring 11 has an integrated structure instead of a structure divided into the upper half section carrier ring 12 and the lower half section carrier ring 13, or has a structure divided into three pieces or more, it is sufficient if the first bearing pad 30 and the second bearing pad 32 are disposed in the lower half region of the carrier ring 11.

The first bearing pad 30 and the second bearing pad 32 can indicate any two bearing pads disposed adjacent to each other in the circumferential direction, and not particular bearing pads. For instance, in a configuration where three bearing pads are disposed from the upstream side with respect to the rotational direction S, when focusing on the most upstream bearing pad and the intermediate bearing pad, the most upstream bearing pad is the first bearing pad 30, and the intermediate bearing pad is the second bearing pad 32. Alternatively, when focusing on the intermediate bearing pad and the most downstream bearing pad, the intermediate bearing pad is the first bearing pad 30, and the most downstream bearing pad is the second bearing pad 32.

Next, with reference to FIGS. 3 to 13, the oil guide portion 40, 50 and their peripheral structures will be described.

In the bearing device 10 according to some embodiments, the oil guide portion 40, 50 includes grooves 17b, 18b that extend in the circumferential direction along the side surface of the first bearing pad 30 in at least a part of the extending range of the first bearing pad 30, in respective regions of the inner peripheral surfaces of the side plates 17, 18 that are closer to the lower half section carrier ring 13. For instance, the grooves 17b, 18b are formed by recess portions defined by protruding portions 17a, 18a disposed on the inner peripheral surfaces of the respective side plates 17, 18 and the inner peripheral surfaces of the side plates 17, 18 closer to the lower half section carrier ring 13 than the protruding portions 17a, 18a. The protruding portions 17a, 18a extend along the outer periphery of the rotor shaft 2 on both sides, with respect to the rotational direction S of the rotor shaft 2, across the downstream end portion of the first bearing pad 30. As described above, by providing the protruding portions 17a, 18a on the inner peripheral surfaces of the side plates 17, 18 along the outer periphery of the rotor shaft 2, it is possible to form the grooves (recess portions) 17b, 18b with a simple configuration.

The grooves 17b, 18b may extend along the outer periphery of the rotor shaft 2, in a circumferential-directional range including the extending range of the first bearing pad 30 and the second bearing pad 32.

Accordingly, it is possible to guide oil with a relatively low-temperature that leaks sideways from the first bearing pad 30 downstream toward the upstream end portion of the second bearing pad 32, via the grooves 17b, 18b disposed on the side plates 17, 18 in the circumferential-directional range including the existing range of the first bearing pad 30 and the second bearing pad 32.

The bottom surfaces of the grooves 17b, 18b (surfaces facing the outer peripheral surface of the rotor shaft 2) are positioned on the inner side of the outer peripheral surface 30b of the first bearing pad 30, with respect to the radial direction of the lower half section carrier ring 13.

With this configuration, the grooves 17b, 18b are disposed on the inner side of the outer peripheral surface 30b of the first bearing pad 30, with respect to the radial direction, and thus it is possible to prevent oil that flows through the grooves 17b, 18b from flowing into the outer peripheral surface 30b of the first bearing pad 30.

Also, the bottom surfaces of the grooves 17b, 18b may be positioned on the inner side of the outer peripheral surface 32b of the second bearing pad 32, with respect to the radial direction of the lower half section carrier ring 13.

Figure 4:
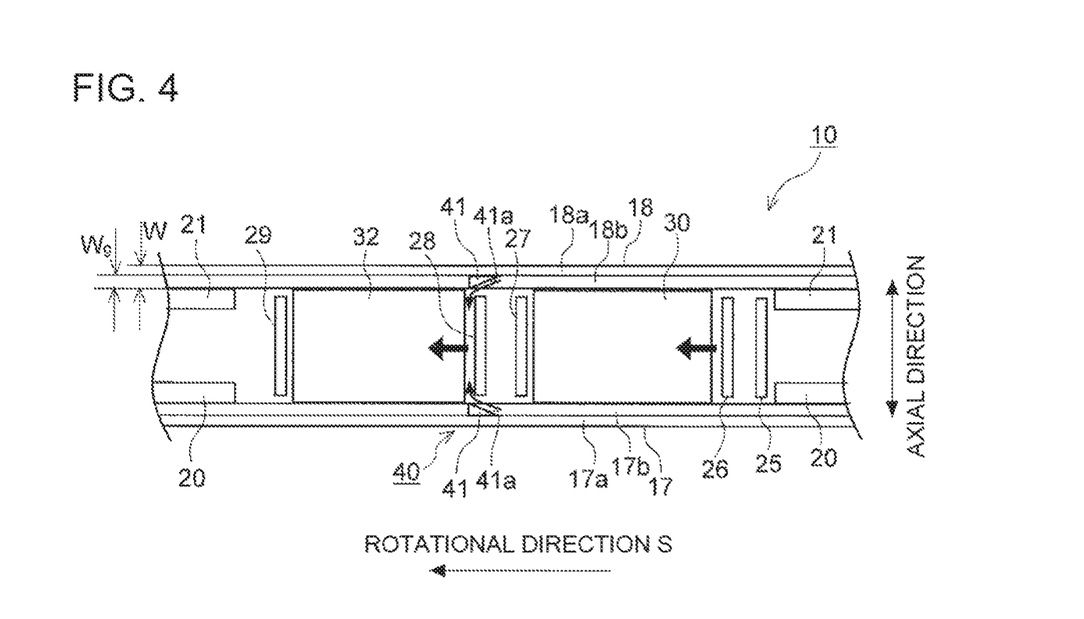
FIG. 4 is an exploded view of the lower half region of the bearing device shown in FIG. 3, as seen in the direction C.
Figure 8:
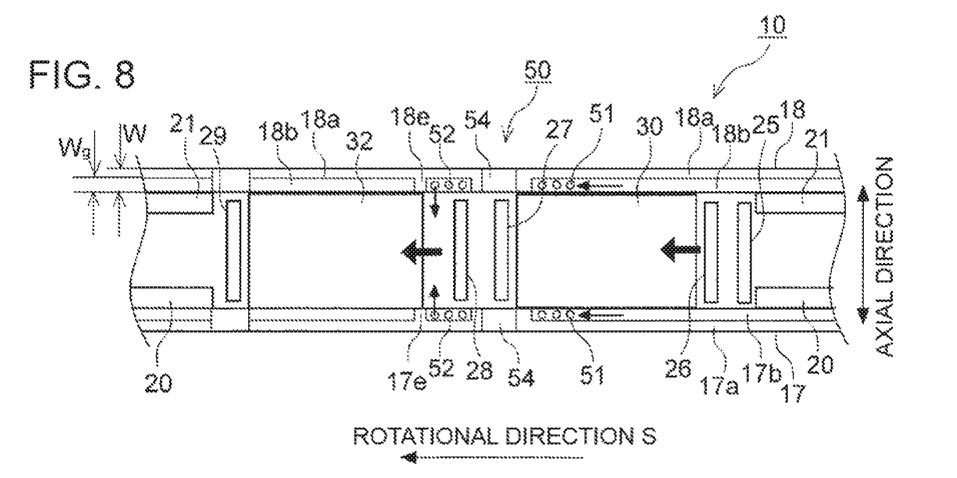
FIG. 8 is an exploded view of the lower half region of the bearing device shown in FIG. 7, as seen in the direction F.

Furthermore, as shown in FIGS. 4 and 8, provided that W is the entire width of each side plate 17, 18 in the axial direction and $W_g$ is the axial-directional width of the grooves 17b, 18b, an expression $0.15W \leq W_g$ may be satisfied.

In this way, it is possible to ensure a sufficient flow-passage cross sectional area for the grooves 17b, 18b, and to effectively guide oil with a relatively low-temperature leaking sideways from the gap between the inner peripheral surface 30a of the first bearing pad 30 and the outer peripheral surface of the rotor shaft 2 downstream toward the oil guide portion 40, 50.

The bearing device 10 according to an embodiment includes grooves 17b, 18b that extend in the circumferential direction along the side surface of the first bearing pad 30 in at least a part of the extending range of the first bearing pad 30, in respective regions of the inner peripheral surfaces of the side plates 17, 18 that are closer to the lower half section carrier ring 13. For instance, the grooves 17b, 18b are formed by recess portions defined by protruding portions 17a, 18b disposed on the inner peripheral surfaces of the respective side plates 17, 18 and the inner peripheral surfaces of the side plates 17, 18 closer to the lower half section carrier ring 13 than the protruding portions 17a, 18a. The protruding portions 17a, 18a extend along the outer periphery of the rotor shaft 2 on both sides, with respect to the rotational direction S of the rotor shaft 2, across the downstream end portion of the first bearing pad 30. As described above, by providing the protruding portion 17a, 18a on the inner peripheral surfaces of the side plates 17, 18 along the outer periphery of the rotor shaft 2, it is possible to form the grooves (recess portions) 17b, 18b with a simple configuration.

The grooves 17b, 18b may extend along the outer periphery of the rotor shaft 2, in a circumferential-directional range including the extending range of the first bearing pad 30 and the second bearing pad 32.

Accordingly, it is possible to guide oil with a relatively low-temperature that leaks sideways from the first bearing pad 30 downstream toward the upstream end portion of the second bearing pad 32, via the grooves 17b, 18b disposed on the side plates 17, 18 in the circumferential-directional range including the extending range of the first bearing pad 30 and the second bearing pad 32.

The bottom surfaces of the grooves 17b, 18b (surfaces facing the outer peripheral surface of the rotor shaft 2) are positioned on the inner side of the outer peripheral surface 30b of the first bearing pad 30, with respect to the radial direction of the lower half section carrier ring 13.

With this configuration, the grooves 17b, 18b are disposed on the inner side of the outer peripheral surface 30b of the first bearing pad 30, with respect to the radial direction, and thus it is possible to prevent oil flowing through the grooves 17b, 18b from flowing into the outer peripheral surface 30b of the first bearing pad 30.

Also, the bottom surfaces of the grooves 17b, 18b may be positioned on the inner side of the outer peripheral surface 32b of the second bearing pad 32, with respect to the radial direction of the lower half section carrier ring 13.

Furthermore, as shown in FIGS. 4 and 8, provided that W is the entire width of each side plate 17, 18 in the axial direction and $W_g$ is the axial-directional width of the grooves 17b, 18b, an expression $0.15W \leq W_g$ may be satisfied.

In this way, it is possible to ensure a sufficient flow-passage cross sectional area for the grooves 17b, 18b, and to effectively guide oil with a relatively low-temperature leaking sideways from the gap between the inner peripheral surface 30a of the first bearing pad 30 and the outer peripheral surface of the rotor shaft 2 downstream toward the oil guide portion 40, 50.

In an embodiment, the gap between the inner peripheral surface of each side plate 17, 18 and the outer peripheral surface of the rotor shaft 2 is narrower in a circumferential-directional region which is at least a part of the extending range of the first bearing pad 30, than in a circumferential-directional range that is upstream of the upstream end portion of the first bearing pad 30 and downstream of the downstream end portion of the second bearing pad 32.

In this way, with the gap between the inner peripheral surface of each side plate 17, 18 and the outer peripheral surface of the rotor shaft 2 in the circumferential-directional region of at least a part of the extending range of the first bearing portion being relatively small, it is possible to suppress discharge of relatively low-temperature oil in the grooves 17b, 18b to outside via the gap. Accordingly, it is possible to ensure a sufficient flow rate of relatively low-temperature oil (oil flowing through the groove) introduced to the second bearing pad 32 by the oil guide portion 40, 50.

As shown in FIGS. 3 to 12, in some embodiments, the bearing device 10 further includes the oil guide portion 40, 50.

The oil guide portion 40, 50 is configured to guide oil flowing into the grooves 17b, 18b from the gap between the inner peripheral surface 30a of the first bearing pad 30 and the outer peripheral surface of the rotor shaft 2, and return the oil to the gap between the downstream end portion of the first bearing pad 30 and the upstream end portion of the second bearing pad 32.

With the above configuration, oil having a relatively low-temperature flowing through the grooves 17b, 18b that extend in the circumferential direction along the side surface of the first bearing pad 30 is returned by the oil guide portion 40, 50 to the gap between the downstream end portion of the first bearing pad 30 and the upstream end portion of the second bearing pad 32. Thus, it is possible to supply the relatively low-temperature oil to the gap between the inner peripheral surface of the second bearing pad 32 and the outer peripheral surface of the rotor shaft 2, and to effectively suppress temperature increase of the second bearing pad 32.

Further, the above described oil-supply nozzles (the third oil-supply nozzle 27 and the fourth oil-supply nozzle 28) are disposed between the downstream end portion of the first bearing pad 30 and the upstream end portion of the second bearing pad 32. The oil-supply nozzles 27, 28 have oil injection holes 27b, 28b which inject oil, and the injected oil is supplied to the gap between the inner peripheral surface 32a of the second bearing pad 32 and the outer peripheral surface of the rotor shaft 2. Thus, even in a case where oil leaks outside from the gap between the inner peripheral surfaces of the side plates 17, 18 and the outer peripheral surface of the rotor shaft 2, it is possible to supply a sufficient amount of oil that can ensure a good lubricating property, to the gap between the inner peripheral surface 32a of the second bearing pad 32 and the outer peripheral surface of the rotor shaft 2.

Next, the bearing device 10 according to each embodiment will be described in detail.

Figure 3:
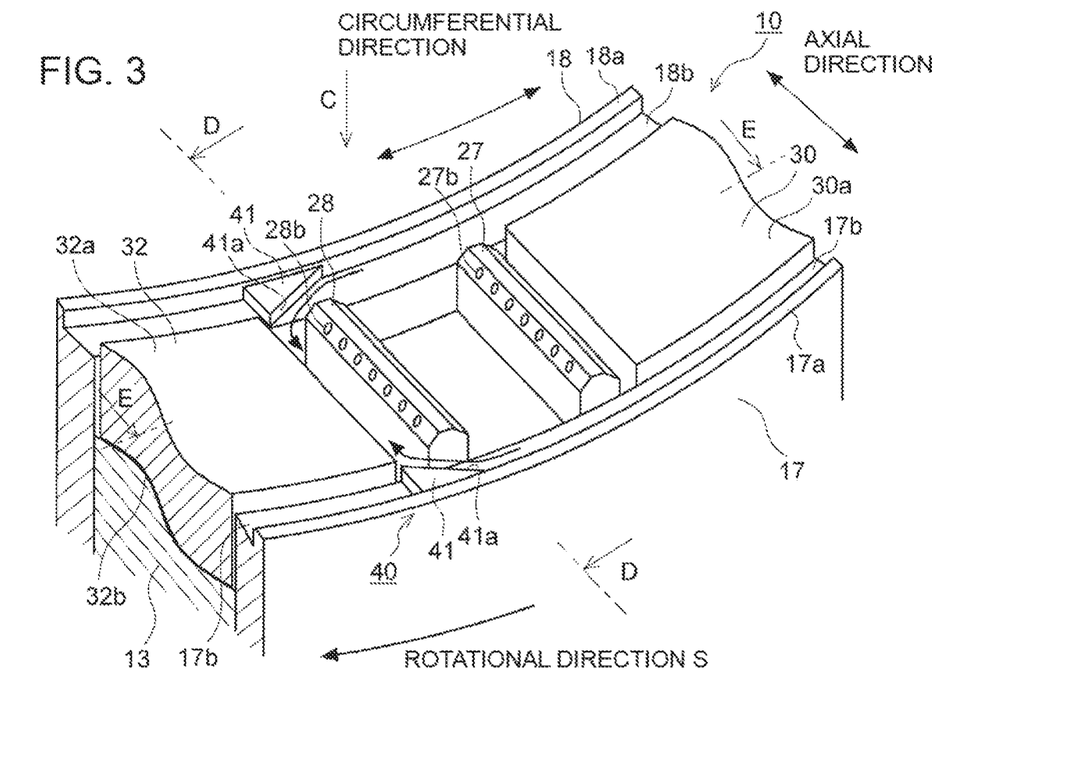
FIG. 3 is a perspective view partially showing a lower half region of a bearing device according to an embodiment.
Figure 5:
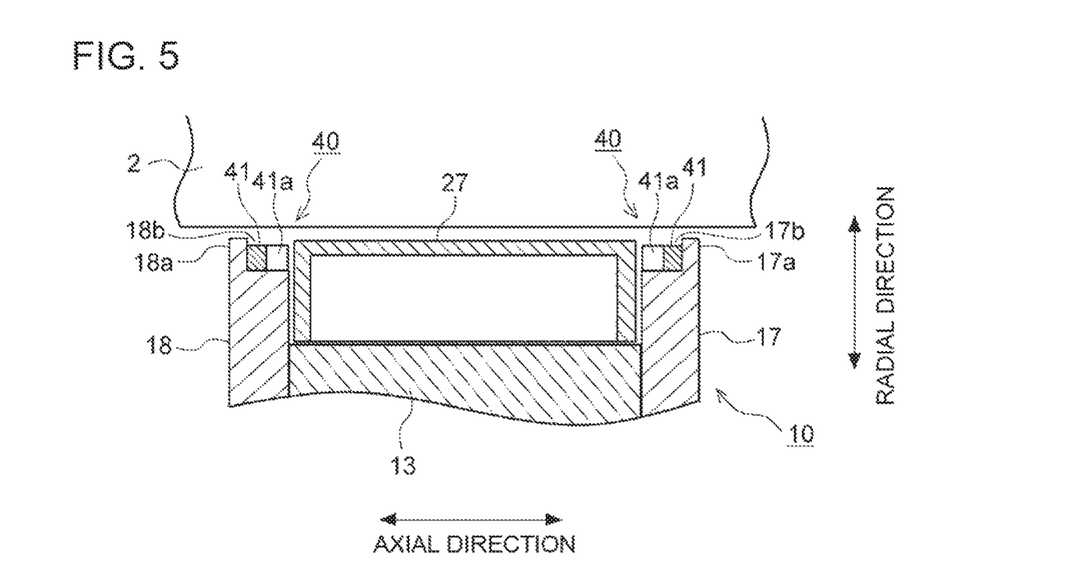
FIG. 5 is a cross-sectional view of the lower half region of the bearing device shown in FIG. 3, taken along line D-D.
Figure 6:
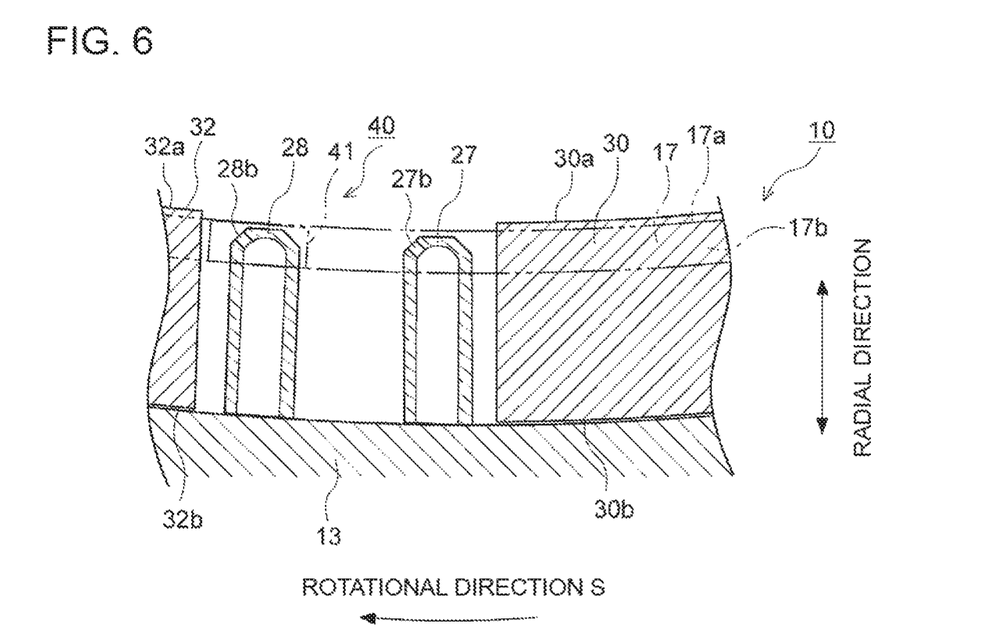
FIG. 6 is a cross-sectional view of the lower half region of the bearing device shown in FIG. 3, taken along line E-E.

FIG. 3 is a perspective view partially showing a lower half region of the bearing device 10 according to an embodiment. FIG. 4 is an exploded view of the lower half region of the bearing device 10 shown in FIG. 3, as seen in the direction C. FIG. 5 is a cross-sectional view of the lower half region of the bearing device 10 shown in FIG. 3, taken along line D-D. FIG. 6 is a cross-sectional view of the lower half region of the bearing device 10 shown in FIG. 3, taken along line E-E.

In an embodiment, the oil guide portion 40 includes a flow guide wall 41 disposed on each of the side plates 17, 18 so as to protrude toward the lower half section carrier ring 13 in the grooves 17b, 18b.

The flow guide wall 41 has an inclined surface 41a inclined from a direction orthogonal to the axial direction of the rotor shaft 2 so as to become closer to the lower half section carrier ring 13 toward the downstream side with respect to the rotational direction S of the rotor shaft 2. In the illustrated example, the flow guide wall 41 has a triangular shape including an inclined surface 41a as a side, in a plan view (view in the C direction of FIG. 3). Alternatively, although not shown, the flow guide wall 41 may have a rectangular shape including the inclined surface 41a. Furthermore, in the illustrated example, the inclined surface 41a has a planar shape. Alternatively, although not shown, the inclined surface 41a may have a curved surface shape protruding downstream in the rotational direction S in a plan view. Further, the flow guide wall 41 may be disposed upstream of the second bearing pad 32 with respect to the rotational direction S. Alternatively, the flow guide wall 41 may be disposed upstream of the second bearing pad 32 and downstream of the first bearing pad 30 with respect to the rotational direction S.

With the above configuration, the oil guide portion 40 includes the flow guide wall 41 disposed on each of the side plates 17, 18 so as to protrude toward the lower half section carrier ring 13 in the grooves 17b, 18b, and thus it is possible to change the flow direction of oil flowing through the grooves 17b, 18b toward the center side with respect to the width direction of the second bearing pad 32, with the flow guide wall 41. Furthermore, the flow guide wall 41 has an inclined surface 41a inclined from a direction orthogonal to the axial direction of the rotor shaft 2 so as to become closer to the lower half section carrier ring 13 toward the downstream side of the rotational direction S of the rotor shaft 2, and thus it is possible to change the flow direction smoothly without impairing the flow of oil inside the grooves 17b, 18b.

Figure 7:
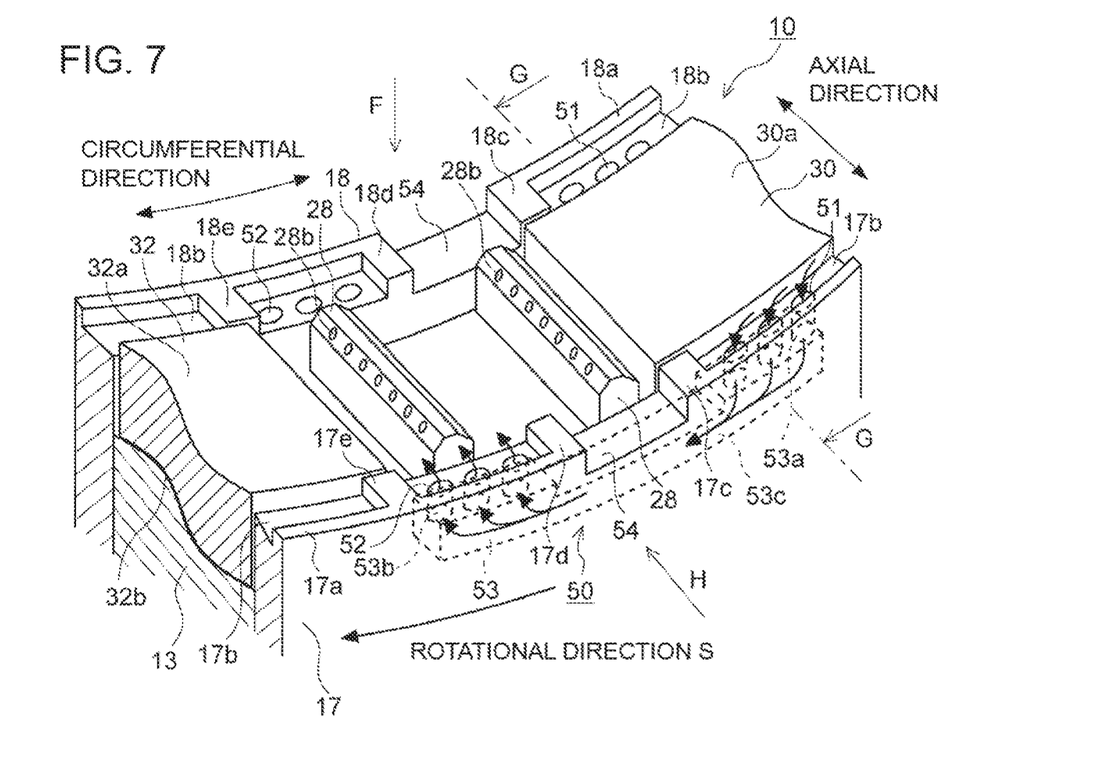
FIG. 7 is a perspective view partially showing a lower half region of a bearing device according to another embodiment.
Figure 9:
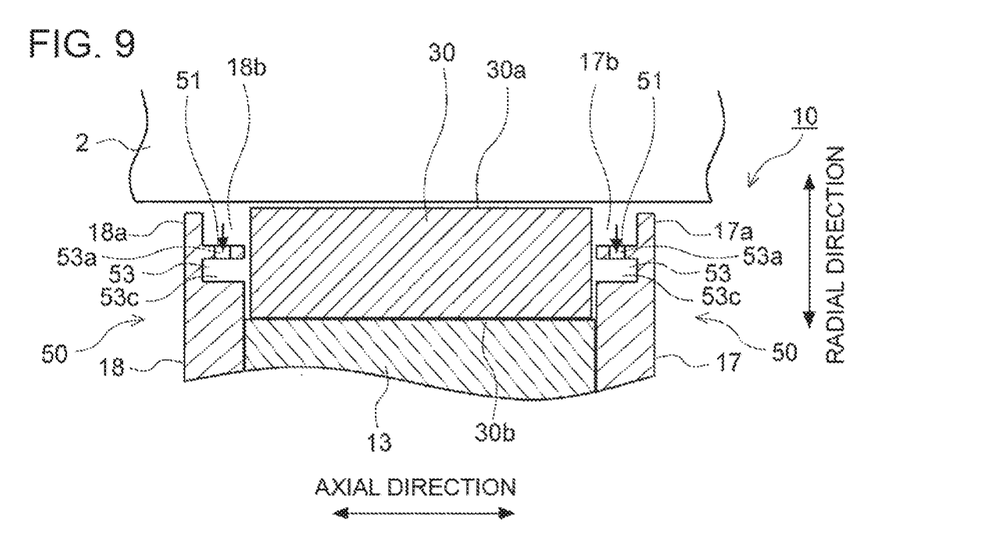
FIG. 9 is a cross-sectional view of the lower half region of the bearing device shown in FIG. 7, taken along line G-G.
Figure 10:
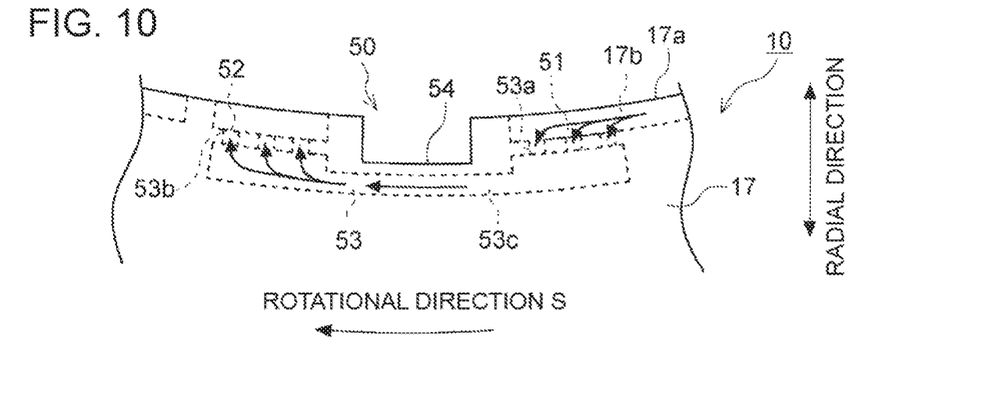
FIG. 10 is an arrow directional view of the lower half region of the bearing device shown in FIG. 7, as seen in the direction H.
Figure 11:
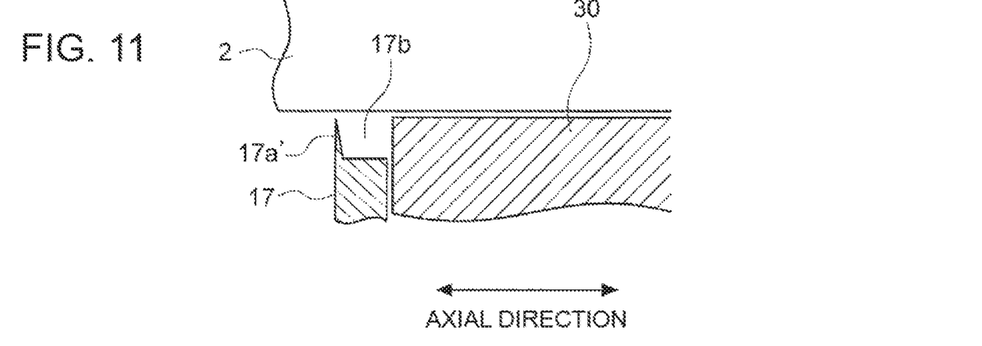
FIG. 11 is a cross-sectional view showing a configuration example of a side plate according to another embodiment.
Figure 12:
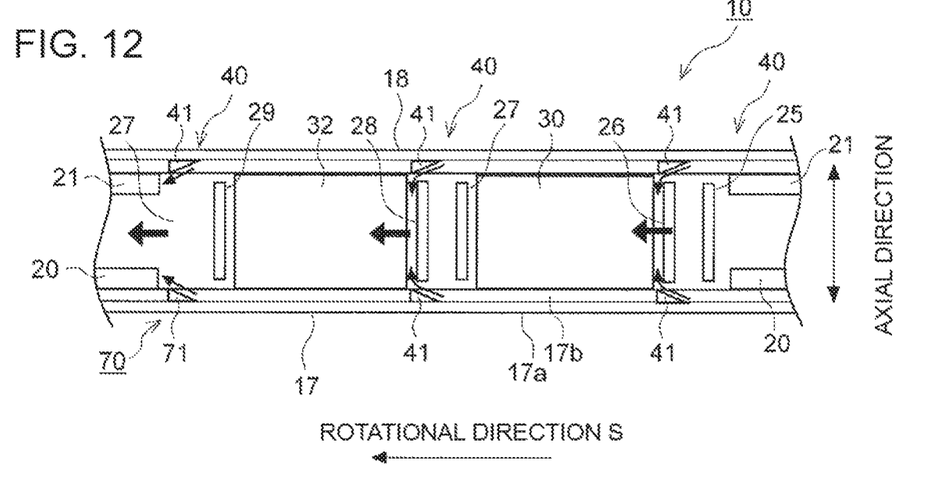
FIG. 12 is a cross-sectional view partially showing the lower half region of a bearing device according to another embodiment (corresponding to FIG. 4).

FIG. 7 is a perspective view partially showing a lower half region of the bearing device 10 according to another embodiment. FIG. 8 is an exploded view of the lower half region of the bearing device 10 shown in FIG. 7, as seen in the direction F. FIG. 9 is a cross-sectional view of the lower half region of the bearing device 10 shown in FIG. 7, taken along line G-G FIG. 10 is a cross-sectional view of the lower half region of the bearing device 10 shown in FIG. 7, taken along line H-H. FIG. 11 is a cross-sectional view of a modified example of the bearing device 10 shown in FIG. 7 (corresponding to FIG. 4). FIG. 12 is a cross-sectional view of another modified example of the bearing device 10 shown in FIG. 7 (corresponding to FIG. 8).

In the bearing device 10 according to another embodiment, the oil guide portion 50 includes an inner flow passage 53 disposed inside the side plates 17, 18 so as to bring into communication the oil inlet aperture 51 and the oil outlet aperture 52 each having an opening into the grooves 17b, 18b. The oil inlet aperture 51 is disposed so as to be positioned by the side of the first bearing pad 30. Specifically, the oil inlet aperture 51 has an opening on the bottom surface of the grooves 17b, 18b (surface facing the rotor), and at least one oil inlet aperture is provided. The oil outlet aperture 52 is disposed on a circumferential-directional position between the downstream end portion of the first bearing pad 30 and the upstream end portion of the second bearing pad 32. Specifically, the oil outlet aperture 52 has an opening on the bottom surface of the grooves 17b, 18b (surface facing the rotor shaft 2), and at least one oil inlet aperture is provided. In the example shown in the drawing, the inner flow passage 53 includes a plurality of first radial-directional flow passages 53a extending radially outward from respective oil inlet apertures 51, a plurality of second radial-directional flow passages 53b extending radially outward from the respective oil outlet apertures 52, and a single circumferential-directional flow passage 53c extending in the circumferential direction and being in communication with the plurality of first radial-directional flow passages 53a and the plurality of second radial-directional flow passages 53b.

In this embodiment, the flow of oil (side flow) in the grooves 17b, 18b passes through the inner flow passage 53 from the oil inlet aperture 51 by the side of the first bearing pad 30, and returns into the grooves 17b, 18b from the oil outlet aperture 52 disposed between the downstream end portion of the first bearing pad 30 and the upstream end portion of the second bearing pad 32. Thus, it is possible to limit the flow passage of the side flow between the first bearing pad 30 and the second bearing pad 32 to the inner flow passage 53, and guide the side flow reliably from the first bearing pad 30 toward the second bearing pad 32.

Further, in an embodiment, the side plates 17, 18 include flange portions 17e, 18e protruding inward in the axial direction from the protruding portions 17a, 18a, so as to traverse the grooves 17b, 18b on the downstream side of the oil outlet aperture 52. That is, the flange portions 17e, 18e are configured to prevent the oil that is returned into the grooves 17b, 18b from the oil outlet aperture 52 from flowing in the rotational direction S. Thus, the oil that is returned to the grooves 17b, 18b from the oil outlet aperture 52 flows along the axial direction toward the upstream end portion of the second bearing pad 32. Accordingly, it is possible to introduce the low-temperature oil flowing through the grooves 17b, 18b to the upstream side of the second bearing pad 32.

In another embodiment, the oil outlet aperture 52 may be disposed inclined so as to face toward the center of the bearing device 10 in the axial direction. Accordingly, the low-temperature oil returned to the grooves 17b, 18b from the oil outlet aperture 52 has its flow direction turned by the oil outlet aperture 52, and is introduced smoothly to the upstream side of the second bearing pad 32.

In the above configuration, an opening portion 54a may be formed on each side plate 17, 18 on the downstream side of the first bearing pad 30 and the upstream side of the second bearing pad 32. Specifically, the protruding portions 17a, 18a formed on the side plates 17, 18 terminate on the downstream side of the first bearing pad 30 and the upstream side of the second bearing pad 32, and protruding portions 17c, 18c and protruding portions 17d, 18d are disposed so as to protrude inward in the axial direction from the terminating ends of the protruding portions 17a, 18a. The protruding portion 17c and the protruding portion 17d are disposed separated from each other in the circumferential direction, and each wall surface of the protruding portion 17c and the protruding portion 17d and the inner peripheral surface of the side plate 17 form the opening portion 54a. Similarly, the protruding portion 18c and the protruding portion 18d are disposed separated from each other in the circumferential direction, and each wall surface of the protruding portion 18c and the protruding portion 18d and the inner peripheral surface of the side plate 18 form the opening portion 54a. That is, the opening portion 54a is formed by a recess portion where an edge portion of the inner peripheral surface side of the side plates 17, 18 is recessed in the radial direction. Via the opening portion 54a, the space between the downstream end portion of the first bearing pad 30 and the upstream end portion of the second bearing pad 32 and the outer space of the bearing device 10 are in communication in the axial direction. With this opening portion 54a, before a part of the high-temperature oil that flows between the inner peripheral surface 30a of the first bearing pad 30 and the outer peripheral surface of the rotor shaft 2 in the circumferential direction of the rotor shaft 2 flows into the gap between the inner peripheral surface 32a of the second bearing pad 32 and the outer peripheral surface of the rotor shaft 2, the oil is discharged via the opening portion 54a formed on the side plates 17, 18, which contributes to suppression of temperature increase of the second bearing pad 32.

As described above, according to an embodiment of the present invention, the relatively low-temperature oil flowing through the grooves 17b, 18b extending in the circumferential direction along the side surface of the first bearing pad 30 is returned to the gap between the downstream end portion of the first bearing pad 30 and the upstream end portion of the second bearing pad 32, and thus it is possible to supply the relatively low-temperature oil to the gap between the inner peripheral surface 32a of the second bearing pad 32 and the outer peripheral surface of the rotor shaft 2, and to effectively suppress temperature increase of the second bearing pad 32.

Embodiments of the present invention were described in detail above, but the present invention is not limited thereto, and various amendments and modifications may be implemented.

Figure 13:
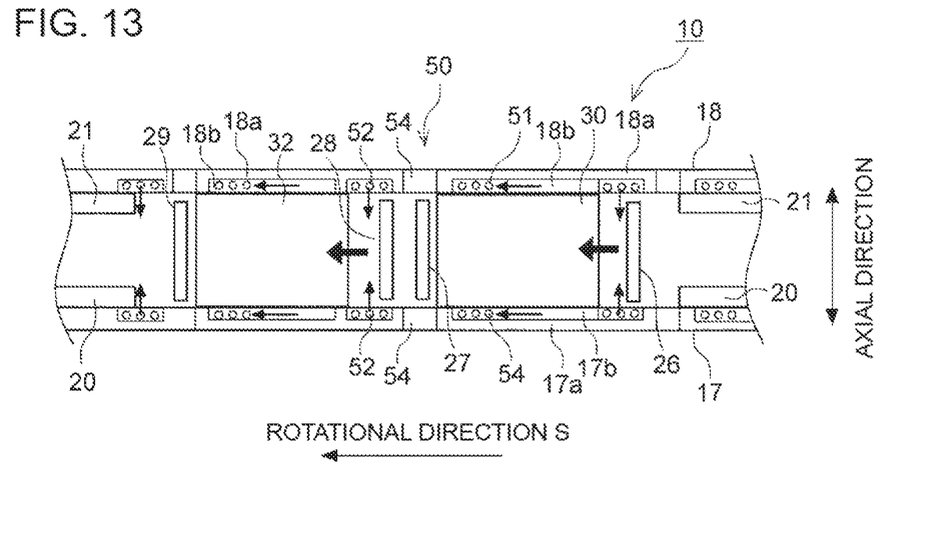
FIG. 13 is a cross-sectional view partially showing the lower half region of a bearing device according to yet another embodiment (corresponding to FIG. 8).

For instance, while the grooves 17b, 18b are formed by the protruding portions 17a, 18a disposed on the side plates 17, 18 in the embodiment shown in FIGS. 3 to 10, as shown in FIG. 11, the groove 17b may be formed by a fin 17a' disposed on the side plate 17. Herein, FIG. 11 is a cross-sectional view along the axial direction of the side plate 17 in another embodiment. With reference to FIGS. 3, 7, and 13 described above, the fin 17a' is disposed on the inner peripheral surface of the side plate 17, and extends along the outer periphery of the rotor shaft 2 on both sides, with respect to the rotational direction of the rotor shaft 2, across the downstream end portion of the first bearing pad 30. Further, the groove 17b is formed by a recess portion defined by the fin 17a' and the inner peripheral surface of the side plate 17 that is closer to the lower half section carrier ring 13 than the fin 17a'. While the side plate 18 is not shown in the drawing, also on the side plate 18, a groove 18b is formed by a fin. With this configuration, by providing the fin 17a' on the inner peripheral surfaces of the side plates 17, 18 along the outer periphery of the rotor shaft 2, it is possible to form the grooves (recess portions) with a simple configuration. Furthermore, since a portion other than the fin 17a', of the outer peripheral surface of the side plate 17, 18, functions as the grooves 17b, 18b, it is possible to ensure a sufficient flow-passage cross sectional area for the grooves 17b, 18b to guide relatively low-temperature oil leaking sideways from the gap between the inner peripheral surface 30a of the first bearing pad 30 and the outer peripheral surface of the rotor shaft 2.

Furthermore, while the oil guide portion 40, 50 returns the side flow to the gap between the downstream end portion of the first bearing pad 30 and the upstream end portion of the second bearing pad 32 in the embodiment shown in FIGS. 3 to 10, the return position of the side flow may be between any adjacent bearing portions (20, 21, 30, 32).

For instance, as shown in FIGS. 12 and 13, from among the plurality of bearing portions including semi-circular bearing portions (guide metals 20, 21) and the bearing pads (30, 32), the side flow may be returned between two bearing portions being adjacent in the circumferential direction. In an illustrative embodiment shown in FIG. 12, the flow guide wall 41 is disposed between the semi-circular bearing portions (guide metals 20, 21) and the first bearing pad 30, between the first bearing pad 30 and the second bearing pad 32, and between the second bearing pad 32 and the semi-circular bearing portion (guide metals 20, 21). Furthermore, in an illustrative embodiment shown in FIG. 13, oil after passing through the inner flow passage 53 is returned to the gap between the semi-circular bearing portions (guide metals 20, 21) and the first bearing pad 30, between the first bearing pad 30 and the second bearing pad 32, and between the second bearing pad 32 and the semi-circular bearing portions (guide metals 20, 21).

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Rotary machine
2 Rotor shaft
10 Bearing device
11 Carrier ring
12 Upper half section carrier ring
13 Lower half section carrier ring
17, 18 Side plate
17a, 18a Protruding portion
17a' Fin
17b, 19b Groove
20, 21 Guide metal (semi-circular bearing portion)
25 to 29 Oil-supply nozzle
30 First bearing pad
32 Second bearing pad
40 Oil guide portion
41 Flow guide wall
41a Inclined surface
42a Opening portion
43 Inner flow passage
50 Oil guide portion
51 Oil inlet aperture
52 Oil outlet aperture
53 Inner flow passage
53a First radial-directional flow passage
53b Second radial-directional flow passage
53c Circumferential-directional flow passage

The invention claimed is:
1. A bearing device, comprising:
a carrier ring;
a first bearing portion disposed along an outer periphery of a rotor shaft on a radially inner side of the carrier ring;
a second bearing portion disposed along the outer periphery of the rotor shaft and downstream of the first bearing portion, with respect to a rotational direction of the rotor shaft, on the radially inner side of the carrier ring; and
a pair of side plates disposed along the outer periphery of the rotor shaft, on both sides of the carrier ring with respect to an axial direction, wherein, in a carrier-ring side region of an inner peripheral surface of each of the side plates, a groove extending in a circumferential direction along a side surface of the first bearing portion is formed at least in a part of an extending range of the first bearing portion, and wherein the bearing device further comprises an oil guide portion configured to guide oil after flowing into the groove from a gap between an inner peripheral surface of the first bearing portion and an outer peripheral surface of the rotor shaft and return the oil to a gap between a downstream end portion of the first bearing portion and an upstream end portion of the second bearing portion.

2. The bearing device according to claim 1, wherein the oil guide portion includes a flow guide wall disposed on each of the side plates so as to protrude toward the carrier ring inside the groove, and wherein the flow guide wall is inclined from a direction orthogonal to an axial direction of the rotor shaft, so as to become closer to the carrier ring toward a downstream side with respect to the rotational direction of the rotor shaft.

3. The bearing device according to claim 1, wherein the oil guide portion includes an inner flow passage disposed inside the side plates so as to bring into communication an oil inlet aperture and an oil outlet aperture each of which has an opening into the groove, wherein the oil inlet aperture is positioned by the side of the first bearing portion, and wherein the oil outlet aperture is disposed at a position that is between the downstream end portion of the first bearing portion and the upstream end portion of the second bearing portion.

4. The bearing device according to claim 1, wherein the groove extends along the outer periphery of the rotor shaft, in a circumferential-directional range including an extending range of the first bearing portion and the second bearing portion.

5. The bearing device according to claim 1, wherein, provided that W is an entire width of each of the side plates in the axial direction and $W_g$ is an axial directional width of the groove, an expression $0.15W \leq W_g$ is satisfied.

6. The bearing device according to claim 1, further comprising a fin which is disposed on an inner peripheral surface of each of the side plates and which extends along the outer periphery of the rotor shaft on both sides across the downstream end portion of the first bearing portion with respect to the rotational direction of the rotor shaft, wherein the groove is formed by a recess portion defined by the fin and the inner peripheral surface of each of the side plates which is closer to the carrier ring than the fin.

7. The bearing device according to claim 1, wherein a gap between the inner peripheral surface of each of the side plates and the outer peripheral surface of the rotor shaft is narrower in a circumferential directional region of at least a part of an extending range of the first bearing portion than in at least a part of a circumferential directional range upstream of an upstream end portion of the first bearing portion and downstream of a downstream end portion of the second bearing portion.

8. The bearing device according to claim 1, wherein a bottom surface of the groove is positioned on an inner side of an outer peripheral surface of the first bearing portion, with respect to a radial direction of the carrier ring.

9. The bearing device according to claim 1, further comprising a semi-circular bearing portion disposed on a radially inner side of an upper half region of the carrier ring and configured to restrain backlash of the rotor shaft from above, wherein the first bearing portion and the second bearing portion are a pair of respective bearing pads disposed on a radially inner side of a lower half region of the carrier ring and configured to support the rotor shaft from below.

10. A rotary machine, comprising:
a bearing device according to claim 1; and
a rotational shaft supported by the bearing device.

* * * * *